(12) United States Patent
Dibble et al.

(10) Patent No.: US 7,031,465 B1
(45) Date of Patent: Apr. 18, 2006

(54) NETWORK INTERFACE DEVICE AND METHOD

(75) Inventors: Kevin S. Dibble, Carrollton, TX (US); Christopher Q. Eckert, Lewisville, TX (US); Wayne T. Daniel, Garland, TX (US); Clyde Musgrave, Frisco, TX (US)

(73) Assignee: Efficient Networks, Inc., Dallas, TX (US)

( * ) Notice: Subject to any disclaimer, the term of this patent is extended or adjusted under 35 U.S.C. 154(b) by 433 days.

(21) Appl. No.: 10/017,209

(22) Filed: Dec. 13, 2001

(51) Int. Cl.
*H04M 3/00* (2006.01)

(52) U.S. Cl. .................................................. 379/418

(58) Field of Classification Search ............ 379/211.03, 379/399.01–413.04, 418
See application file for complete search history.

(56) References Cited

U.S. PATENT DOCUMENTS

| | | | |
|---|---|---|---|
| 5,539,805 A * | 7/1996 | Bushue et al. ............... | 379/361 |
| 6,546,098 B1 * | 4/2003 | Henderson .................... | 379/397 |
| 6,584,197 B1 * | 6/2003 | Boudreaux et al. ..... | 379/413.02 |
| 6,714,644 B1 * | 3/2004 | Cohn et al. .................. | 379/372 |
| 6,757,382 B1 * | 6/2004 | Wilkes et al. ........... | 379/399.01 |

* cited by examiner

*Primary Examiner*—Curtis Kuntz
*Assistant Examiner*—Alexander Jamal
(74) *Attorney, Agent, or Firm*—Baker Botts L.L.P.

(57) ABSTRACT

A network interface device includes a first interface operable to receive at least two incoming calls over a subscriber line, and a second interface operable to facilitate communication between the first interface and a first telephone line and between the first interface and a second telephone line. The second interface is also operable to generate one or more first ring voltages on the first telephone line and one or more second ring voltages on the second telephone line. The network interface device also includes a processor coupled to the first interface and the second interface. The processor is operable to instruct the second interface to generate the first and second ring voltages in response to receiving the incoming calls. The processor is also operable to allocate the first and second ring voltages among the first and second telephone lines to ensure that a total instantaneous load placed on the second interface does not exceed a determined threshold level.

29 Claims, 6 Drawing Sheets

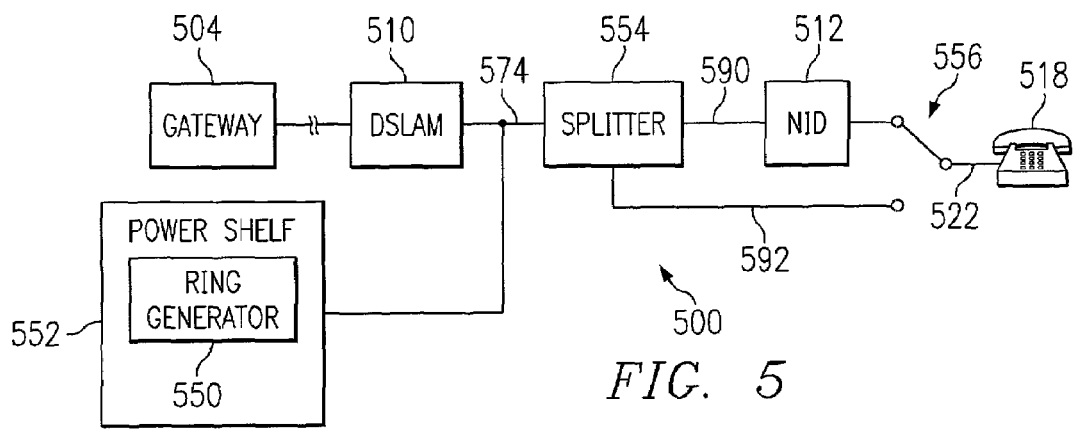
FIG. 5
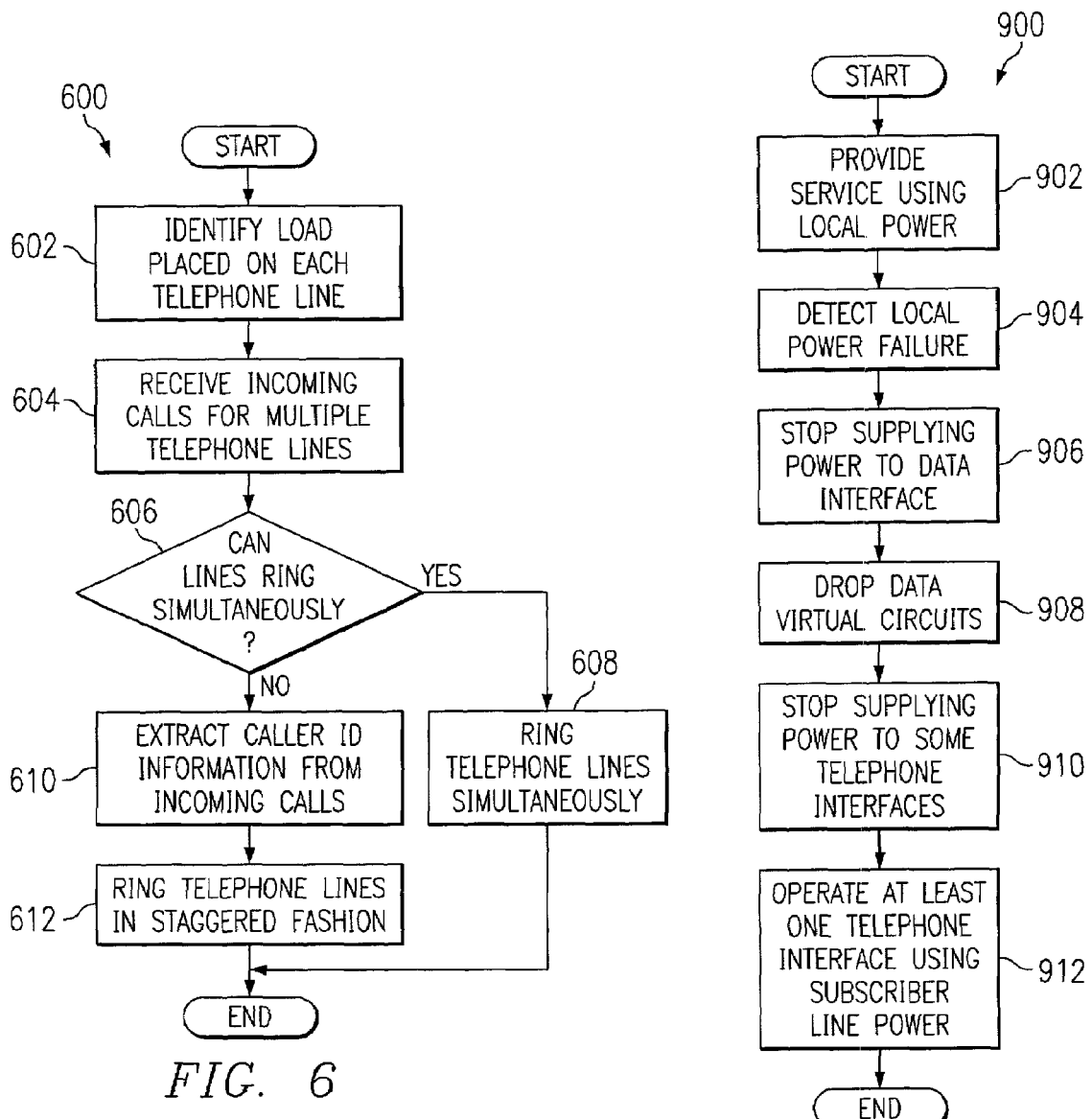
FIG. 6
FIG. 9

NETWORK INTERFACE DEVICE AND METHOD

TECHNICAL FIELD OF THE INVENTION

This invention relates generally to communication systems, and more particularly to a network interface device and method.

BACKGROUND

Telephone service providers typically use network interface devices (NIDS) to provide telephone service to their customers. The network interface device typically connects the inside wiring of the customer's premises, such as the internal telephone wiring in a customer's home, to the telephone network. The network interface device often has two "sides," one to the central office of the telephone service provider and one to the customer's telephone lines. Typical network interface devices include a protective enclosure and passive circuitry with terminal blocks and line protectors. Analog signals typically pass through the network interface device unmodified except for hazardous voltages, such as lightning, which are clamped by the line protectors.

SUMMARY

The present invention recognizes a need for an improved network interface device and method, which reduce or eliminate at least some of the problems and disadvantages associated with prior systems and methods.

In one embodiment of the invention, a network interface device includes a first interface operable to receive at least two incoming calls over a subscriber line, and a second interface operable to facilitate communication between the first interface and a first telephone line and between the first interface and a second telephone line. The second interface is also operable to generate one or more first ring voltages on the first telephone line and one or more second ring voltages on the second telephone line. The network interface device also includes a processor coupled to the first interface and the second interface. The processor is operable to instruct the second interface to generate the first and second ring voltages in response to receiving the incoming calls. The processor is also operable to allocate the first and second ring voltages among the first and second telephone lines to ensure that a total instantaneous load placed on the second interface does not exceed a determined threshold level.

Numerous technical advantages can be gained through various embodiments of the invention. Various embodiments of the invention may exhibit none, some, or all of the following advantages depending on the particular implementation and features selected. For example, in one embodiment, a network interface device is provided. In particular, the network interface device may include an interface to facilitate communication over the network supported by the service provider. As a particular example, the network interface device may support communication over a network using a digital subscriber line (DSL) or cable modem interface. The DSL or cable interface may allow a larger amount of information to be communicated over the network. The interface may also allow different types of traffic, such as analog voice and facsimile traffic and data traffic, to be communicated to and received from the network.

Another advantage of at least some embodiments of the invention is that power consumption by the network interface device may be reduced. For example, in one embodiment, the network interface device may receive incoming calls for multiple telephone lines. The network interface device may generate ring voltages on the telephone lines, causing the telephones coupled to the telephone lines to ring. However, generating the ring voltages requires power. As a result, ringing multiple telephone lines simultaneously may require more power than the network interface device can draw from a line power supply. In one embodiment, the network interface device may determine which telephone lines can be rung at the same time without requiring an excessive amount of power. Based on that determination, the network interface device may ring two or more telephone lines simultaneously, and/or the network interface device may ring two or more telephone lines in a staggered fashion. By staggering the ringing, the network interface device may reduce the amount of power required at any particular point in time, which helps to reduce the power consumption of the network interface device at any particular point in time.

In addition, at least some embodiments of the invention help to increase the service area that may be served by a service provider. For example, in a particular embodiment, the network interface device may operate partially or entirely using power drawn from the subscriber line coupled to the service provider's network. The amount of power that can be drawn from the subscriber line typically decreases as the distance between the customer and the network equipment increases. By decreasing the amount of power required to operate the network interface device, the network interface device may be used at greater distances from the network equipment. This allows the service provider to offer the network interface device to a larger customer base, helping to increase the possible revenue to the service provider.

Other technical advantages will be readily apparent to one of skill in the art from the attached figures, description, and claims.

BRIEF DESCRIPTION OF THE DRAWINGS

For a more complete understanding of the present invention and the features and advantages thereof, reference is now made to the following descriptions taken in connection with the accompanying drawings, in which:

FIG. 5 illustrates an example system for providing ringing power to a telephone constructed according to the teachings of the present invention;

FIG. 6 illustrates an example method for signaling telephone lines according to the teachings of the present invention;

FIG. 9 illustrates an example method for providing service during a power loss according to the teachings of the present invention.

DETAILED DESCRIPTION OF EXAMPLE EMBODIMENTS

Figure 1:
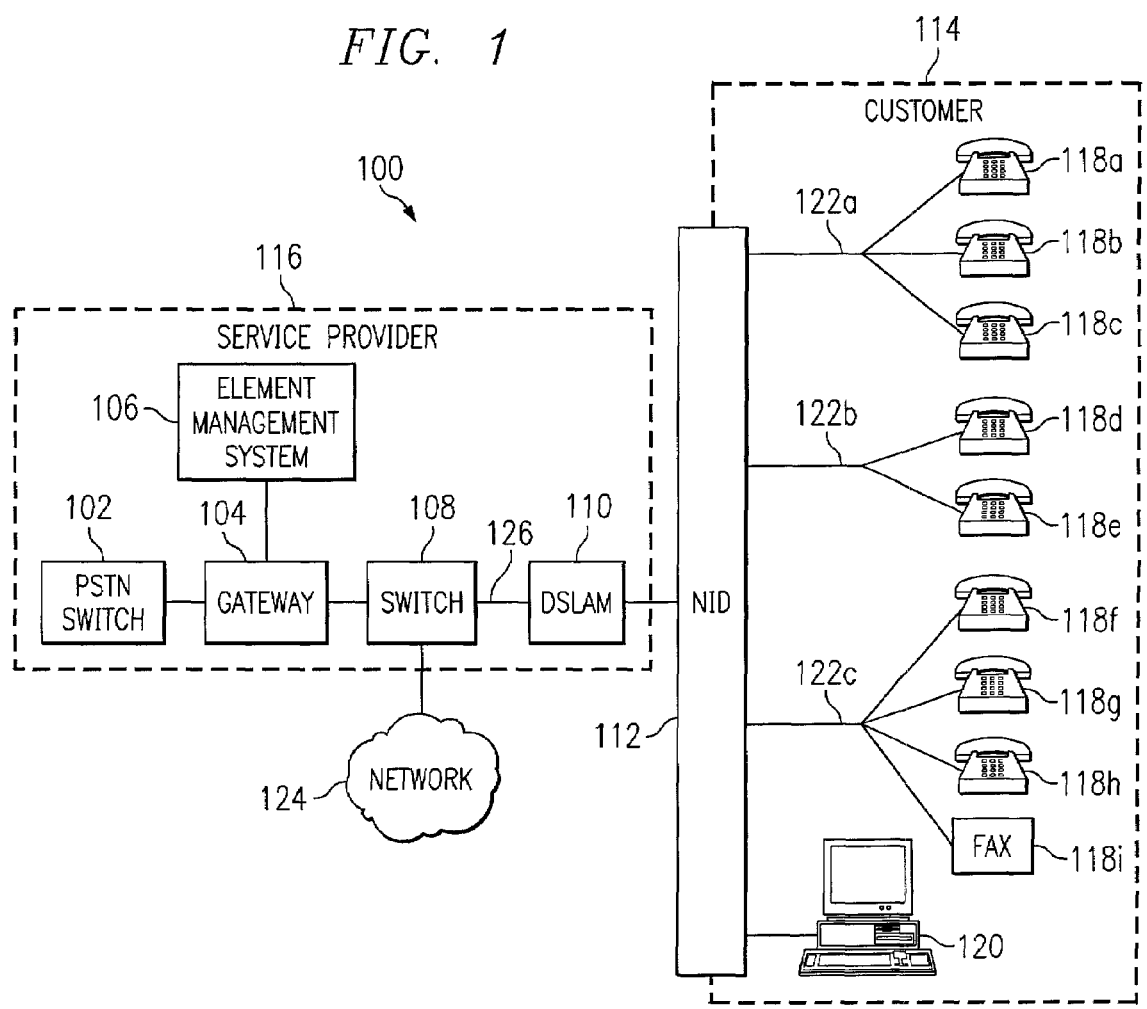
FIG. 1 illustrates an example communications system constructed according to the teachings of the present invention.

FIG. 1 illustrates an example communications system 100 constructed according to the teachings of the present invention. In the illustrated embodiment, system 100 includes a public switched telephone network (PSTN) switch 102, a voice gateway 104, an element management system 106, a switch 108, a digital subscriber line access multiplexer (DSLAM) 110, and a network interface device (NID) 112. Other embodiments of system 100 may be used without departing from the scope of the present invention.

In one aspect of operation, network interface device 112 facilitates communication between a customer 114 and a service provider 116. For example, network interface device 112 may facilitate communication between service provider 116 and one or more analog devices 118, such as telephones and facsimile machines, and one or more digital devices 120, such as computers and packet-based telephones, at customer 114.

As a particular example, network interface device 112 may receive one or more incoming telephone calls or facsimile transmissions for devices 118 from PSTN switch 102, and network interface device 112 may generate ring voltages on one or more telephone lines 122 connected to devices 118. In a particular embodiment, network interface device 112 may determine whether the ring voltages can be generated on telephone lines 122 simultaneously, and/or network interface device 112 may generate the ring voltages on telephone lines 122 in a staggered fashion. This helps to ensure that network interface device 112 does not use an excessive amount of power in generating the ring voltages. In another particular embodiment, network interface device allows customer 114 to reassign different telephone numbers to different telephone lines 122. For example, customer 114 could map all telephone numbers to a single telephone line 122, map a selected telephone number to a selected telephone line 122, and/or redirect an incoming call on one telephone line 122 to another telephone line 122.

PSTN switch 102 is coupled to gateway 104. In this document, the term "couple" refers to any direct or indirect communication between two or more elements, whether or not those elements are in physical contact with one another. PSTN switch 102 could comprise any time division multiplexed (TDM) based switch, such as a Class 4 or a Class 5 switch. PSTN switch 102 facilitates communication between customer 114 and other subscribers in system 100 over a PSTN. For example, customer 114 may place a local telephone call to another subscriber, and PSTN switch 102 establishes a connection between customer 114 and the called subscriber. Customer 114 may also place a long distance telephone call to another subscriber, and PSTN switch 102 communicates with a long distance network to establish the long distance telephone call. PSTN switch 102 may comprise any hardware, software, firmware, or combination thereof operable to provide local telephone service and/or access to long distance service.

Gateway 104 is coupled to PSTN switch 102, element management system 106, and switch 108. Gateway 104 facilitates communication between PSTN switch 102 and switch 108. Switch 108 can comprise any hardware, software, firmware, or combination thereof operable to direct communications in a frame-, packet-, cell-, or other datagram-based protocol. Signals communicated to and/or received from switch 108 by gateway 104 could comprise data, voice, video, facsimile, or any other information format. For ease of description, the following examples assume that switch 108 comprises an Asynchronous Transfer Mode (ATM) switch. Other signal protocols, such as Frame Relay and Internet Protocol, could be used without departing from the scope of the present invention. In one embodiment, PSTN switch 102 communicates using a time division multiplex (TDM) protocol, and switch 108 communicates using an ATM protocol. Gateway 104 performs an interworking function to facilitate communication between PSTN switch 102 and switch 108 using these different protocols. For example, gateway 104 may receive an ATM cell from switch 108, extract the information in the ATM cell, and communicate the information to PSTN switch 102 in a proper TDM format. Similarly, gateway 104 may receive information from PSTN switch 102 in TDM format and place the information into an ATM cell for communication to switch 108. Gateway 104 may comprise any hardware, software, firmware, or combination thereof operable to facilitate communication between PSTN switch 102 and switch 108.

Element management system 106 is coupled to gateway 104. Element management system 106 may monitor one or more components of system 100 used by service provider 116. For example, element management system 106 may collect information related to the operation and behavior of DSLAM 110 or other component of system 100. Element management system 106 may also reconfigure DSLAM 110 or other component of system 100, such as by limiting the number of customers 114 that a single DSLAM 110 may serve. Element management system 106 may perform any other and/or additional operations in system 100 without departing from the scope of the present invention. Element management system 106 may comprise any hardware, software, firmware, or combination thereof operable to provide management services in system 100.

Switch 108 is coupled to gateway 104, DSLAM 110, and a network 124. Switch 108 facilitates the communication of information between gateway 104, DSLAM 110, and/or network 124. For example, switch 108 may receive ATM cells from DSLAM 110, determining whether the ATM cells are destined for PSTN switch 102 or network 124, and route the ATM cells to gateway 104 or network 124 based on that determination. Network 124 may include one or more local area networks (LANs), metropolitan area networks (MANs), wide area networks (WANs), all or a portion of the global computer network known as the Internet, or any other communications system or systems at one or more locations.

DSLAM 110 is coupled to switch 108 and a plurality of network interface devices 112 associated with a plurality of customers 114 in system 100. DSLAM 110 facilitates communication between customers 114 and switch 108. For example, DSLAM 110 may perform multiplexing and demultiplexing operations to allow multiple customers 114 to communicate with switch 108 over a single backbone line 126, such as an optical carrier (OC) line or a digital service, level three (DS3) line. DSLAM 110 could also support traffic management functions, priority management functions, ATM cell buffering functions, and/or any other suitable functions. DSLAM 110 may comprise any hardware, software, firmware, or combination thereof operable to facilitate communication between a plurality of network interface devices 112 and switch 108. In one embodiment, DSLAM 110 includes a power shelf that provides power to network interface device 112.

Figure 2:
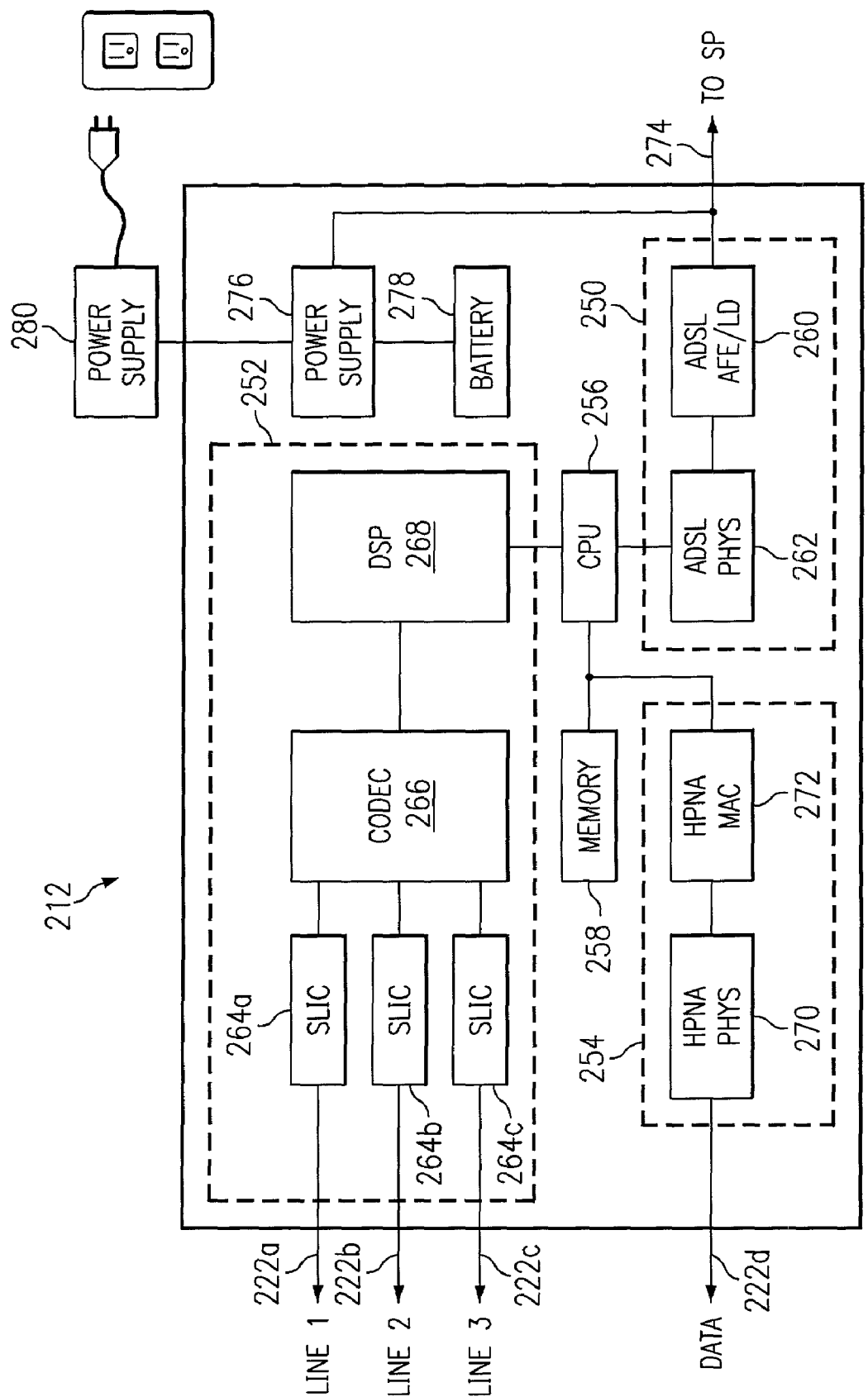
FIG. 2 illustrates an example network interface device constructed according to the teachings of the present invention.

Network interface device 112 is coupled to DSLAM 110, analog devices 118 over one or more telephone lines 122, and one or more digital devices 120. For example, network interface device 112 may receive voice or facsimile traffic from a device 118 over a telephone line 122, place the traffic into one or more ATM cells, and communicate the traffic to DSLAM 110. Network interface device 112 could also receive ATM cells from DSLAM 110 containing voice, facsimile, and/or data traffic for digital device 120, and network interface device 112 may communicate the traffic to device 120. Network interface device 112 may comprise any hardware, software, firmware, or combination thereof operable to facilitate communication between service provider 116 and devices 118 and 120. One embodiment of a network interface device is shown in FIG. 2, which is described below.

In one aspect of operation, one or more telephone numbers may be associated with each telephone line 122 at customer 114. Network interface device 112 may receive one or more calls to one or more of the telephone numbers associated with telephone lines 122. In this document, the term "call" includes telephone calls, facsimile transmissions, and data communications. For each call, network interface device 112 identifies the telephone line 122 associated with the telephone number of the incoming call. Network interface device 112 may generate a ring voltage on the identified telephone line 122, which causes one or more devices 118 coupled to that telephone line 122 to ring. Network interface device 112 may generate the ring voltage on telephone line 122 for any suitable length of time, such as two seconds. After that, network interface device 112 may stop generating the ring voltage on telephone line 122 for a given period of time, such as four seconds. If the incoming call has not been answered, such as when customer 114 does not answer a telephone and/or a facsimile machine does not establish a connection, network interface device 112 may again generate a ring voltage on the telephone line 122. This process may continue until the incoming call is answered or the incoming call is dropped.

In general, each device 118 coupled to a telephone line 122 increases the load placed on that telephone line 122. The load placed on a telephone line 122 by a device 118 may be expressed in terms of a ringer equivalency number (REN) or other suitable measurement. For example, a telephone may increase the load on a telephone line 122 by 1.2 REN. In one embodiment, network interface device 112 is operable to measure the load placed on each telephone line 122. For example, in a particular embodiment, network interface device 112 generates a voltage on a telephone line 122, measures the current generated through telephone line 122 by the voltage, and computes the resistance using the voltage and current measurements. Other methods of measuring the load placed on a telephone line 122 may be used without departing from the scope of the present invention.

In one embodiment, network interface device 112 may receive multiple incoming calls for two or more telephone lines 122. In this embodiment, network interface device 112 may or may not generate ring voltages on more than one telephone line 122 simultaneously. In this document, ring voltages are generated "simultaneously" as long as the ring voltages are generated at least partially during the same time period. However, the generation of the ring voltages need not begin and/or end at the same time. For example, network interface device 112 may begin generating a ring voltage on one telephone line 122a and then begin generating a ring voltage on another telephone line 122b. As long as there is at least some overlap between the generation of the ring voltages, the ring voltages are said to be generated simultaneously.

In one embodiment, if the total load placed on the telephone lines 122 receiving the incoming calls falls below a threshold level, such as below 5 REN, network interface device 112 could generate ring voltages on those telephone lines 122 simultaneously. Because the total load placed on those telephone lines 122 does not exceed the predetermined threshold, network interface device 112 may generate the ring voltages without using an excessive amount of power.

In this embodiment, if the total load placed on the telephone lines 122 receiving the incoming calls exceeds the predetermined threshold, network interface device 112 may use too much power in generating the ring voltages on those lines 122 simultaneously. In that case, network interface device 112 staggers the generation of the ring voltages on those telephone lines 122. As a particular example, network interface device 112 could generate a ring voltage on one telephone line 122a for two seconds. After that, network interface device 112 could generate a ring voltage on another telephone line 122b for another two seconds. This helps to reduce the amount of power consumed by network interface device 112 at any particular time.

In this embodiment, network interface device 112 helps to reduce or eliminate the likelihood that the total instantaneous load placed on device 112 exceeds the threshold level. In this document, the phrase "total instantaneous load" may refer to the combined load placed on network interface device 112 by the one or more telephone lines 122 receiving a ring voltage at any particular time. For example, if network interface device 112 generates ring voltages on all three telephone lines 122 simultaneously, the total instantaneous load during ring voltage generation would equal the combined load of the three lines 122. If network interface device 112 staggers the generation of ring voltages on two lines 112a and 112b, the total instantaneous load would vary. During generation of the ring voltage on line 112a, the total instantaneous load placed on network interface device 112 would equal the load on line 122a. During generation of the ring voltage on line 112b, the total instantaneous load placed on network interface device 112 would equal the load on line 122b.

In another embodiment, network interface device 112 could operate to always stagger the generation of the ring voltages on telephone lines 122, regardless of the load. In this embodiment, network interface device 112 may generate one ring voltage for one telephone line 122 at a time. If network interface device 112 receives multiple incoming calls for multiple telephone lines 122, network interface device 112 may stagger the generation of the ring voltages. Network interface device 112 may generate one ring voltage for one of the telephone lines 122, and network interface device 112 may generate another ring voltage for another telephone line 122 after it terminates the first ring voltage. In this embodiment, network interface device 112 may, but need not, measure the load placed on each telephone line 122 and/or determine whether the total load placed on the telephone lines 122 receiving incoming calls exceeds a predetermined threshold. In this document, two ring voltages are "staggered" when one ring voltage is approximately zero while the other is being generated. This includes the situation where the generation of one ring voltage ends and the generation of another ring voltage begins at the same time.

In one embodiment, network interface device 112 may also map different telephone numbers to different telephone lines 112. For example, network interface device 112 may allow customer 114 to map all telephone numbers to a single telephone line 122. If network interface device 112 receives an incoming call directed at any of the telephone numbers, network interface device 112 routes the call to the selected telephone line 122.

Network interface device 112 could also allow customer 114 to map different telephone numbers to different telephone lines 122. For example, network interface device 112 could allow a customer 114 to re-map a telephone number associated with one telephone line 122 to another telephone line 122.

In addition, network interface device 112 could allow a customer 114 to redirect an incoming call from one telephone line 122 to another telephone line 122. For example, if network interface device 112 generates a ring voltage on a first telephone line 122a, customer 114 could use a communication device 118, such as a telephone coupled to another telephone line 122b, to instruct network interface device 112 to redirect the incoming call to that telephone line 122b. Network interface device 112 could allow customer 114 to perform any other suitable functions without departing from the scope of the present invention.

In one embodiment, customer 114 may manage network interface device 112 through a web site. For example, customer 114 could have an account on a web site of service provider 116, and the web site may allow customer 114 to invoke one or more functions to manage network interface device 112. As particular examples, customer 114 could use a function provided on the web site to map one or more telephone numbers to one or more telephone lines 122. Customer 114 could also use a function provided on the web site to set up a distinctive ringing pattern for each telephone line 122. The server hosting the web site or any other suitable device may then communicate with and provide instructions to network interface device 112, causing network interface device 112 to perform the requested function. In one embodiment, the web server or other device may communicate with network interface device 112 through gateway 104 using an ATM Loop Emulation Services (LES) Embedded Operation Channel (EOC). In addition, one or more programs that allow customer 114 to access the web site and/or use these features may be provided to customer 114 for free or for a fee. Customer 114 could also be charged on a per-operation basis, charged a flat fee for a given time period, or charged in any other suitable manner. This enables the service provider 116 to establish a revenue stream by providing the functions to customer 114.

Although FIG. 1 illustrates one example embodiment of system 100, various changes may be made to system 100 without departing from the scope of the present invention. For example, any suitable number or none of telephone lines 122 may be coupled to network interface device 112, and any suitable number of devices 118 may be coupled to each telephone line 122. Also, network interface device 112 may be coupled to any suitable number of digital devices 120. Further, FIG. 1 illustrates the use of a DSLAM 110 in system 100. System 100 could also use a Digital Loop Carrier Remote Terminal (DLCRT), a cable modem termination system, or any other suitable device or system in place of or in addition to DSLAM 110. Beyond that, network interface device 112 has been described as being controlled by customer 114 through an analog device 118 and/or through the use of a web site. Network interface device 112 could be controlled by customer 114 or other person or entity in any other suitable manner.

In addition, FIG. 1 illustrates one example system 100 in which a network interface device 112 may be used. Network interface device 112 may be used in any other suitable system without departing from the scope of the present invention. For example, while FIG. 1 illustrates network interface device 112 operating in a system 100 having a PSTN switch 102 and a gateway 104, these elements could be replaced by a media gateway coupled to a soft switch. Also, while switch 108 has been described as transporting ATM cells, switch 108 could also transport IP packets, frame relay frames, or other datagrams and/or information in any other suitable format. Further, network interface device 112 could communicate with DSLAM 110 using a DSL or other suitable interface. Network interface device 112 could also communicate over a cable modem interface, a wireless interface, or any other suitable communication interface. Other changes may be made to system 100 without departing from the scope of the present invention.

FIG. 2 illustrates an example network interface device 212 constructed according to the teachings of the present invention. In the illustrated embodiment, network interface device 212 includes a service provider interface 250, an analog interface 252, a data interface 254, a processor 256, and a memory 258. Other embodiments of network interface device 212 may be used without departing from the scope of the present invention.

Service provider interface 250 facilitates communication between network interface device 212 and service provider 116. For example, interface 250 may receive information from service provider 116 and forward the information to processor 256 for delivery to analog interface 252 or data interface 254. Interface 250 may also receive information from analog interface 252 or data interface 254 through processor 256, and interface 250 may communicate the information to service provider 116. Interface 250 may comprise any hardware, software, firmware, or combination thereof operable to facilitate the communication and/or reception of voice, facsimile, and/or data traffic.

In the illustrated embodiment, interface 250 includes an asynchronous digital subscriber line (ADSL) analog front end (AFE) and line driver (LD) 260 and an ADSL physical interface 262. ADSL AFE/LD 260 supports an interface to a subscriber line 274. ADSL physical interface 262 represents the hardware, software, and/or firmware used to provide a physical interface between processor 256 and ADSL AFE/LD 260. ADSL physical interface 262 may, for example, support the protocols used to communicate and receive information using the ADSL communication protocol. ADSL AFE/LD 260 and ADSL physical interface 262 may comprise any hardware, software, firmware, or combination thereof operable to communicate information to and/or receive information from service provider 116. Although FIG. 2 illustrates interface 250 implementing the ADSL protocol, network interface device 212 could also support any of the DSL protocols (xDSL), including full-rate ADSL, ADSL Lite, and very-high-rate DSL (VDSL). Also, although the following description describes network interface device 212 as it relates to DSL transmission, the invention may be used in systems employing other communications protocols. For example, interface 250 could also comprise a cable modem interface, a wireless interface, or any other suitable communication interface. In addition, the invention contemplates other later revisions, modifications, enhancements, or new types of communications techniques.

Subscriber line 274 couples network interface device 212 and a service provider's network. Subscriber line 274 could, for example, couple network interface device 212 and DSLAM 110. Subscriber line 274 may comprise any wireline and/or wireless medium operable to facilitate communication between network interface device 212 and the service provider's network. Subscriber line 274 may, for example, comprise a twisted-pair copper telephone line, a fiber optic line, a coaxial cable, or a wireless link.

Analog interface 252 facilitates communication between network interface device 212 and one or more telephone lines 222. Analog interface 252 may, for example, receive digital information from processor 256, convert the information to analog format, and communicate the information to one or more telephone lines 222. Analog interface 252 may also receive information over a telephone line 222, convert the information to digital information, and communicate the digital information to processor 256. The information communicated and/or received over telephone line 222 may comprise voice, facsimile, and/or data traffic. Analog interface 252 may comprise any hardware, software, firmware, or combination thereof operable to communicate and/or receive information over a telephone line 222.

In the illustrated embodiment, analog interface 252 includes one or more subscriber line interface circuits (SLICs) 264, one or more codecs 266, and a digital signal processor (DSP) 268. Other embodiments of analog interface 252 may be used without departing from the scope of the present invention. For example, a single SLIC 264 could service all telephone lines 222, or a separate codec 266 could service each line 222. In the illustrated example, each SLIC 264 is coupled to a telephone line 222 and a codec 266. SLIC 264 provides the interface between a telephone line 222 and codec 266. SLIC 264 may, for example, receive information in analog format from codec 266 and communicate the information to the telephone line 222. SLIC 264 may also generate a ring voltage on a telephone line 222 to cause devices coupled to telephone line 222, such as telephones or facsimile machines, to ring. SLIC 264 may comprise any hardware, software, firmware, or combination thereof operable to generate a ring voltage on one or more telephone lines 222.

SLIC 264 may also perform other functions in network interface device 212. For example, SLIC 264 may measure the load placed on a telephone line 222. In one embodiment, SLIC 264 may generate a voltage on telephone line 222 and measure the resulting current on that telephone line 222. SLIC 264 may then use this information to identify the resistance placed on telephone line 222. SLIC 264 may make any suitable use of this information, such as communicating this information to codec 266, DSP 268, or processor 256. In one embodiment, SLIC 264 may measure the load on a telephone line 222 after instructed to do so by processor 256. In another embodiment, SLIC 264 may monitor the load placed on a telephone line 222, such as at predetermined intervals or constantly, and inform processor 256 when the load changes.

Codec 266 is coupled to SLICs 264 and DSP 268. Codec 266 is operable to convert analog information into digital information and to convert digital information into analog information. For example, codec 266 may receive analog information from a telephone line 222 through a SLIC 264. Codec 266 may digitize the analog information and communicate the digitized information to DSP 268. Codec may also receive digital information from DSP 268, convert the digital information to analog information, and communicate the analog information to a SLIC 264. Codec 266 may comprise any hardware, software, firmware, or combination thereof operable to convert information between analog and digital formats.

In one embodiment, codec 266 may also decode dual tone multi-frequency (DTMF) touch tones received over a telephone line 222. In this embodiment, a device coupled to a telephone line 222, such as a telephone or facsimile machine, may generate DTMF tones and communicate the tones to network interface device 212. The tones represent the different keys on a keypad, such as the digit keys zero through nine, the star key, and the pound key. Codec 266 receives these tones and identifies the key that corresponds to each DTMF tone received from a telephone line 222. This allows codec 266, for example, to identify a telephone number entered by a customer 114 on a telephone. This may also allow codec 266 to identify special codes entered by a customer 114 on a telephone or other device coupled to telephone line 222. Codec 266 may then, for example, communicate this information to processor 256 through DSP 268.

DSP 268 is coupled to codec 266 and processor 256. DSP 268 may perform various functions in network interface device 212. For example, in one embodiment, DSP 268 receives a digital bit stream from codec 266 representing incoming analog information. DSP 268 may sample the bit stream and communicate the samples to processor 256. DSP 268 could also perform compression functions to compress the samples sent to processor 256. DSP 268 could further perform echo cancellation functions and/or any other suitable functions in network interface device 212. DSP 268 may comprise any hardware, software, firmware, or combination thereof operable to process signals from codec 266 and/or processor 256. Although FIG. 2 illustrates SLICs 264, codec 266, and DSP 268 as comprising separate elements, SLICs 264, codec 266, and DSP 268 could be combined into a single element in a network interface device 212.

Data interface 254 is coupled to processor 256. Data interface 254 facilitates communication between network interface device 212 and one or more devices, such as a desktop computer and an IP telephone, of customer 114. Data interface 254 may, for example, receive incoming voice, facsimile, and/or data traffic from processor 256, place the traffic into a suitable format, and communicate the traffic to the device. Data interface 254 could also receive voice, facsimile, and/or data traffic from the device and communicate the information to processor 256 for communication through interface 250. Data interface 254 may comprise any hardware, software, firmware, or combination thereof operable to facilitate communication with one or more digital devices.

In the illustrated embodiment, data interface 254 supports a Home Phoneline Network Alliance (HPNA) protocol. In this embodiment, one or more digital devices may be coupled to and communicate over a telephone line 222*d*. In this embodiment, network interface 254 includes an HPNA physical interface 270 and an HPNA medium access control (MAC) layer 272. HPNA physical interface 270 represents the hardware, software, and/or firmware used to provide a physical interface between telephone line 222*d* and network interface device 212. HPNA MAC layer 272 controls access to the HPNA physical interface 270. For example, HPNA MAC layer 272 may specify when processor 256 is allowed to access telephone line 222*d* and communicate information to a device. While FIG. 2 illustrates data interface 254 supporting the HPNA protocol, other suitable protocols may be used to communicate information to one or more digital devices. For example, data interface 254 could support communication using Ethernet protocols, local area network protocols, optical interfaces, wireless interfaces such as Bluetooth, or any other suitable interface. Also, while FIG. 2 illustrates data interface 254 connected to a different telephone line 222d than SLICs 264, data interface 254 could also be coupled to one or more of the telephone lines 222a–222c coupled to one or more SLICs 264.

Processor 256 is coupled to service provider interface 250, analog interface 252, data interface 254, and memory 258. Processor 256 facilitates communication and the routing of information between service provider interface 250, analog interface 252, and data interface 254. For example, processor 256 may receive information from service provider 116 through service provider interface 250. Processor 256 determines whether the information should be routed to a telephone line 222 through analog interface 252 or to a digital device through data interface 254. Processor 256 may then communicate the information to the identified destination.

In one embodiment, processor 256 may also control the generation of ring voltages on telephone lines 222 by analog interface 252. For example, processor 256 may determine when a SLIC 264 should generate a ring voltage on a particular telephone line 222. In this embodiment, processor 256 may receive multiple incoming calls for two or more telephone lines 222 through interface 250.

In one embodiment, processor 256 staggers the generation of the ring voltages on telephone lines 222 by SLICs 264. For example, each SLIC 264 may generate a ring voltage on a telephone line 222 for two seconds, followed by a four second pause. In this embodiment, processor 256 may instruct one SLIC 264 to generate the ring voltage for two seconds, while not allowing the other SLICs 264 to generate ring voltages. After the first SLIC 264 stops generating a ring voltage on a telephone line 222, processor 256 may allow another SLIC 264 to generate a ring voltage on another telephone line 222. In this way, processor 256 staggers the generation of the ring voltages on telephone lines 222 by SLICs 264, such that only one SLIC 264 or a limited number of SLICs 264 are generating a ring voltage at any particular time. By limiting the number of SLICs 264 that simultaneously generate a ring voltage on telephone lines 222, processor 256 helps to limit the total power used by network interface device 212 at any particular time. Rather than requiring network interface device 212 to draw enough power to generate ring voltages on multiple telephone lines 222, processor 256 may help to ensure that network interface device 212 only needs to draw enough power to generate a single or a limited number of ring voltages on one or a limited number of telephone lines 222.

In another embodiment, processor 256 may allow multiple SLICs 264 to generate ring voltages on telephone lines 222 simultaneously. In a particular embodiment, each SLIC 264 may measure the load placed on each telephone line 222, and SLIC 264 may communicate the measured load to processor 256. Processor 256 may then allow SLICs 264 to generate ring voltages on multiple telephone lines 222 as long as the combined load on those telephone lines 222 does not exceed a predetermined threshold. For example, processor 256 may allow two or more SLICs 264 to generate ring voltages on multiple telephone lines 222 when the combined load on those telephone lines 222 does not exceed 5 REN. When processor 256 receives multiple incoming calls for two or more telephone lines 222, processor 256 accesses memory 258 and identifies the loads placed on each of those telephone lines 222. If the combined load does not exceed the predetermined threshold, processor 256 may instruct the SLICs 264 associated with those telephone lines 222 to generate ring voltages. If the combined load on those telephone lines 222 does exceed the predetermined threshold, processor 256 may stagger the generation of the ring voltages by SLICs 264 as described above.

Although processor 256 has been described as allowing multiple SLICs 264 to generate ring voltages simultaneously if the combined load on the telephone lines 222 does not exceed 5 REN, any suitable threshold may be used without departing from the scope of the present invention. In particular, as the threshold load decreases, the network interface device 212 may be used at larger distances from DSLAM 110. Also, in another particular embodiment, network interface device 212 may draw enough power from one or more power supplies to generate ring voltages on telephone lines 222 simultaneously. In this embodiment, network interface device 212 may, but need not, measure the load placed on each telephone line 222.

In one embodiment, processor 256 may further allow a customer 114 or other entity in system 100 to map different telephone numbers to different telephone lines. For example, a customer 114 may enter a code on the keypad of a telephone coupled to a telephone line 222. One code may indicate that the customer 114 wishes to direct all calls for customer 114 to a single telephone line 222. Another code could indicate that customer 114 wishes to assign a particular telephone number to a particular telephone line 222. In addition, if one telephone line 222 is receiving an incoming call, yet another code could instruct processor 256 to redirect the call to a different telephone line 222. Other functions may be performed by processor 256 without departing from the scope of the present invention. The code entered by customer 114 creates DTMF tones over telephone line 222, which are received by codec 266. Codec 266 decodes the DTMF tones and identifies the specific buttons pressed by the customer 114. Codec 266 communicates this information to processor 256, which identifies the function requested by the customer 114.

Processor 256 may comprise any hardware, software, firmware, or combination thereof operable to perform one or more of the above-described functions. Although FIG. 2 illustrates a single processor 256, multiple processors 258 may be used without departing from the scope of the present invention.

Memory 258 is coupled to processor 256. Memory 258 stores and facilitates retrieval of information used by processor 256 to perform one or more of the functions described above. Memory 258 may, for example, store instructions to be performed by processor 256 and a mapping of different telephone numbers to one or more telephone lines 222. When processor 256 receives an incoming call, processor 256 may access memory 258 to identify which telephone line 222 should receive the incoming call. Memory 258 may comprise any hardware, software, firmware, or combination thereof operable to store and facilitate retrieval of information. In a particular embodiment, memory 258 may include a flash memory for storing instructions to be performed by processor 256 and a synchronized dynamic random access memory (SDRAM) for storing information used by processor 256 to perform one or more functions. Although FIG. 2 illustrates memory 258 as residing within network interface device 212, all or a portion of memory 258 may reside at any location or locations accessible by processor 256.

In one embodiment, network interface device 212 may be powered by line power supplied over subscriber line 274. In this embodiment, a power supply 276 may draw the power from subscriber line 274 and supply the power to service provider interface 250, DSP 268, processor 256, codec 266, and/or other components of network interface device 212. In place of or in addition to drawing power from subscriber line 274, network interface device 212 could also draw power from a local power supply. The local power supply may include a battery 278 and/or an external power supply 280. The local power supply could also include power drawn through data interface 254, such as through an Ethernet connection. In a particular embodiment, network interface device 212 may use the external power supply 280 as its primary power supply, the battery 278 as a backup power supply, and the power from subscriber line 274 as an emergency power supply. In this embodiment, network interface device 212 may draw power from external power supply 280 during normal operation. If and when power supply 280 fails, network interface device 212 may start drawing power from battery 278. If external power supply 280 and battery 278 fail, network interface device 212 may begin drawing power from subscriber line 274. In a particular embodiment, when network interface device 212 begins drawing power from subscriber line 274, network interface device 212 may deactivate data interface 254 and one or more SLICs 264. This helps to reduce the amount of power consumed by network interface device 212. In this embodiment, network interface device 212 may keep at least one SLIC 264 active, helping to ensure that at least one telephone line 222 is available as a "lifeline." While FIG. 2 illustrates network interface device 212 as including both a battery 278 and an external power supply 280, one or both of these power supplies may be omitted from network interface device 212.

Although FIG. 2 illustrates one example embodiment of a network interface device 212, various changes may be made to network interface device 212 without departing from the scope of the present invention. For example, while FIG. 2 illustrates service provider interface 250 supporting an ADSL protocol, any other suitable protocol may be used to facilitate communication with service provider 116. Similarly, while FIG. 2 illustrates data interface 254 as supporting an HPNA protocol, any other suitable interface may be used. Also, various components of network interface device 212 may be added, removed, and/or combined. As particular examples, codec 266 and DSP 268 may be combined into a single element, and processor 256 and ADSL physical interface 262 could be combined into a single element such as an application-specific integrated circuit (ASIC). In addition, while FIG. 2 illustrates each SLIC 264 associated with a single telephone line 222, a SLIC 264 may be associated with multiple telephone lines 222.

Figure 3:
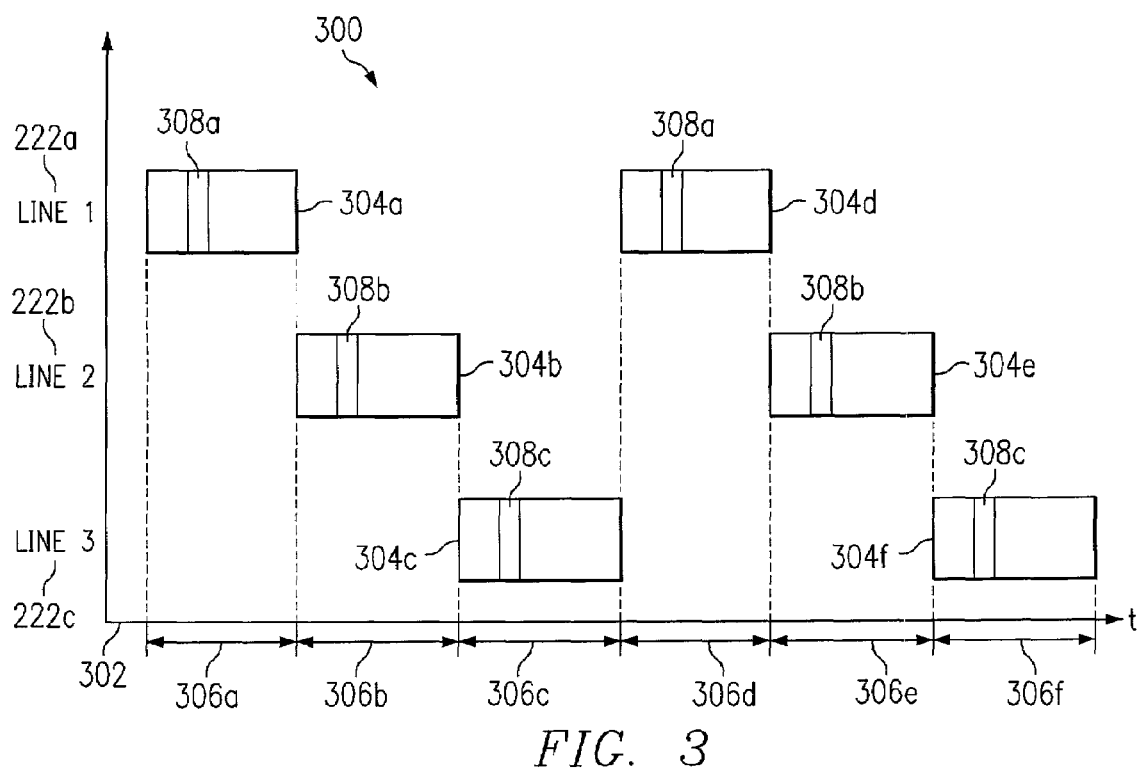
FIG. 3 illustrates an example of staggered ringing performed by the network interface device according to the teachings of the present invention.

FIG. 3 illustrates an example of staggered ringing 300 performed by network interface device 212 according to the teachings of the present invention. In particular, FIG. 3 illustrates how network interface device 212 may stagger the generation of ring voltages 304a–304f on telephone lines 222a–222c over time 302. The staggered ringing 300 shown in FIG. 3 is for illustration only. Any suitable changes, such as a change in the number of telephone lines 222 or in the timing of the staggering, may be implemented without departing from the scope of the present invention.

As illustrated in FIG. 3, network interface device 212 receives incoming calls for three telephone lines 222a–222c. Network interface device 212 staggers the generation of the ring voltages 304 on telephone lines 222, such that only one ring voltage 304 is generated during any particular time slot 306 of time 302. For example, network interface device 212 may generate a ring voltage 304a on telephone line 222a during a time slot 306a. Time slot 306a may represent any suitable length of time, such as two seconds. After time slot 306a, network interface device 212 stops generating ring voltage 304a and begins generating ring voltage 304b on telephone line 222b during time slot 306b. After time slot 306b, network interface device 212 stops generating ring voltage 304b and begins generating ring voltage 304c during time slot 306c. After time slot 306c, network interface device 212 repeats the process, generating ring voltages 304d–304f during time slots 306d–306f, respectively. By staggering the generation of the ring voltages 304, network interface device 212 helps to limit the amount of power used by network interface device 212 during any particular time slot 306. For example, producing ring voltages 304a–304c in a single time slot 306a may require more power than network interface device 212 could draw from a subscriber line 274. Staggering the generation of the ring voltages 304 to three time slots 306a–306c helps to reduce the amount of power used by network interface device 212 during any one time slot 306. This helps to reduce the likelihood that network interface device 212 will need more power than it can draw during a time slot 306.

As shown in FIG. 3, during the generation of a ring voltage 304, network interface device 212 may also communicate class of service information, such as caller identification (ID) information 308, over a telephone line 222. When network interface device 212 receives an incoming call, processor 256 may extract the caller ID information 308 from the incoming call and store the information 308 in memory 258. During the generation of a ring voltage 304, processor 256 may then communicate the caller ID information 308 over a telephone line 222 through analog interface 252. By extracting and storing the caller ID information 308, network interface device 212 helps to ensure that the information 308 is not lost due to the delay caused by staggering the ring voltages 304.

Network interface device 212 may or may not make a determination whether to stagger the generation of ring voltages 304a–304f. In one embodiment, network interface device 212 always staggers the generation of ring voltages 304. In this embodiment, network interface device 212 may be programmed to stagger the generation of the ring voltages 304, such that network interface device 212 generates a single ring voltage 304 during any particular time slot 306. In another embodiment, network interface device 212 may calculate the load placed on each telephone line 222 and determine that only one ring voltage 304 can be generated during each time slot 306.

In this document, for ease of explanation, phrases such as "first ring voltages" and "second ring voltages" may be used to differentiate the ring voltages generated on different telephone lines. However, the use of these phrases does not imply that different voltage levels are being generated on the telephone lines 222. For example, in FIG. 3, ring voltages 304a and 304d on line 222a could be referred to as first ring voltages, while ring voltages 304b and 304e on line 222b could be referred to as second ring voltages. Ring voltages 304a and 304d could, but need not, represent identical voltage levels as ring voltages 304b and 304e. Similarly, the description of the ring voltages on a single telephone line 222 as "first" or "second" ring voltages does not necessarily indicate that all ring voltages generated on that telephone line 222 have the same voltage level. For example, while ring voltages 304a and 304d on line 222a could be referred to as first ring voltages, ring voltages 304a and 304d could represent identical or different voltage levels.

Although FIG. 3 illustrates one example of staggered ringing 300 that may be performed by network interface device 212, various changes may be made to FIG. 3 without departing from the scope of the present invention. For example, a different number of telephone lines 222 may receive incoming calls. Also, for any particular telephone line 222, network interface device 212 may generate any suitable number of ring voltages 304. For example, on telephone line 222a, a customer 114 may answer line 222a after the generation of the first ring voltage 304a. In that case, network interface device 212 would not need to generate a second ring voltage 304d on that telephone line 222a. Network interface device 212 could also generate additional ring voltages 304 on a telephone line 222 if the incoming call is not answered after the generation of two ring voltages 304.

Figure 4:
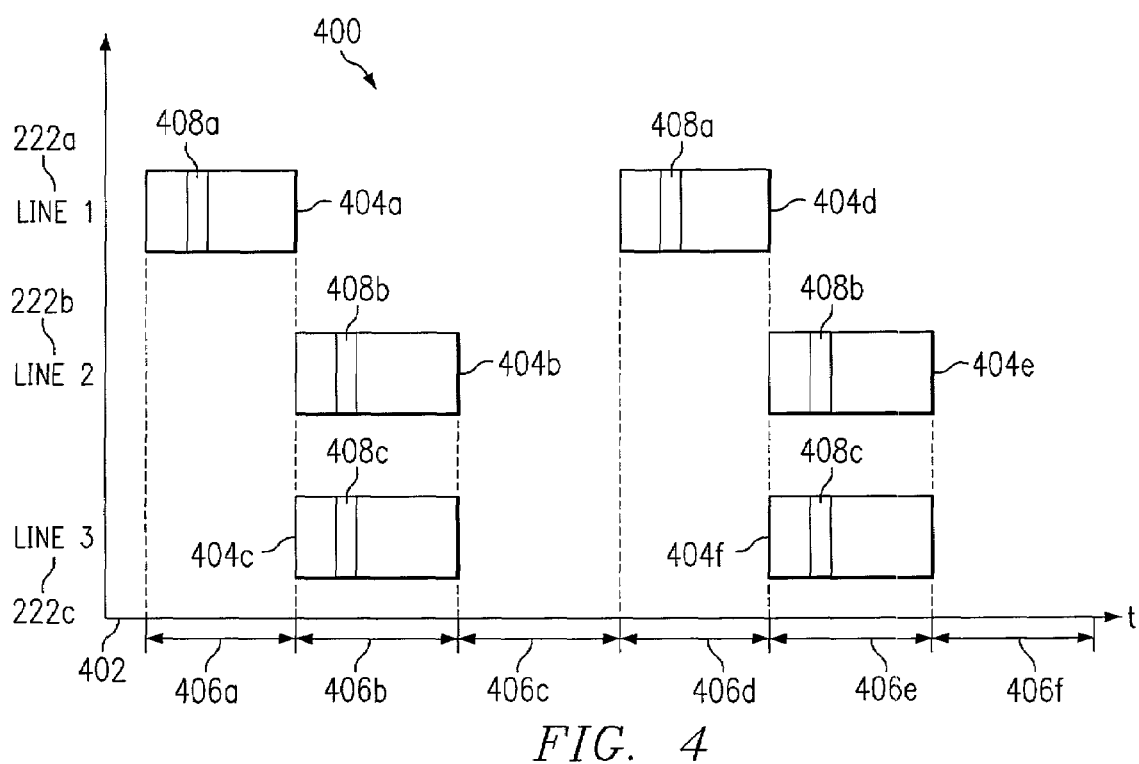
FIG. 4 illustrates another example of staggered ringing performed by the network interface device according to the teachings of the present invention.

FIG. 4 illustrates another example of staggered ringing 400 performed by network interface device 212 according to the teachings of the present invention. In particular, FIG. 4 illustrates network interface device 212 staggering the generation of some ring voltages 404 while simultaneously generating other ring voltages 404 over time 402. The staggered ringing 400 illustrated in FIG. 4 is for illustration only.

As shown in FIG. 4, network interface device 212 receives incoming calls for three telephone lines 222a–222c. Network interface device 212 examines the load placed on each telephone line 222 and determines that ring voltages 404 may be generated on telephone lines 222b and 222c during the same time slot 406. Network interface device 212 also determines that the ring voltage 404 generated on telephone line 222a cannot be generated during the same time slot 406 as the other telephone lines 222b and 222c. As a result, network interface device 212 staggers the generation of the ring voltages 404, generating a ring voltage 404a on line 222a during time slot 406a. After time period 406a, network interface device 212 generates ring voltages 404b and 404c on the other two telephone lines 222b and 222c, respectively, during time slot 406b. After time slot 406b, network interface device 212 does not generate a ring voltage 404 during time slot 406c. In one embodiment, network interface device 212 may use a ring cadence that includes ringing a telephone line 222a for two seconds followed by a pause of four seconds. Because of this cadence, network interface device 212 may not generate any ring voltages during time slot 406c. After time slot 406c, network interface device 212 repeats the process, generating a ring voltage 404d on line 222a followed by the generation of ring voltages 404e and 404f on lines 222b and 222c, respectively.

During the generation of the ring voltages 404, network interface device 212 may also communicate class of service information, such as caller ID information 408, to telephone lines 222. Network interface device 212 communicates caller ID information 408a to telephone line 222a during the appropriate time slots 406a and 406d. Similarly, network interface device 212 communicates caller ID 408b and 408c to telephone lines 222b and 222c during time slots 406b and 406e. This helps to ensure that the devices coupled to telephone lines 222 receive and display the caller ID information 408 to customer 114 during the appropriate times.

In the illustrated embodiment, network interface device 212 has determined that ring voltages 404 may be generated on telephone lines 222b and 222c during the same time slot 406. In this embodiment, network interface device 212 may have measured the load placed on each telephone line 222a–222c and determined that the combined load on telephone lines 222b and 222c does not exceed a predetermined threshold. Network interface device 212 may also have determined that the combined load on telephone lines 222a–222c does exceed the predetermined threshold, so network interface device 212 does not generate ring voltages 404 for all three telephone lines 222 during the same time slot 406.

While FIG. 4 illustrates one example of staggered ringing 400, various changes may be made to FIG. 4 without departing from the scope of the present invention. For example, FIG. 4 illustrates network interface device 212 generating ring voltages 404 for telephone lines 222b and 222c during the same time slot 406. Network interface device 212 could also generate ring voltages 404 for other combinations of telephone lines 222, such as for telephone lines 222a and 222c. Also, any suitable number of telephone lines 222 may be coupled to and signaled by network interface device 212. In addition, while FIG. 4 illustrates the generation of two ring voltages 404 for each telephone line 222, any suitable number of ring voltages 404 may be generated for each telephone line 222. For example, if customer 114 answers a telephone coupled to telephone line 222a after the first ring voltage 404a, network interface device 212 may not need to generate ring voltage 404d. Network interface device 212 could also generate additional ring voltages 404 on a telephone line 222 if the incoming call is not answered after the generation of two ring voltages 404.

FIG. 5 illustrates an example system 500 for providing power to a ringing telephone 518 constructed according to the teachings of the present invention. In the illustrated embodiment, system 500 includes a gateway 504, a DSLAM 510, a network interface device 512, a power shelf 552 having a ring generator 550, a splitter 554, and a switch 556. Other embodiments of system 500 may be used without departing from the scope of the present invention.

Gateway 504 and DSLAM 510 may be the same or similar to gateway 104 and DSLAM 110, respectively, of FIG. 1. Also, network interface device 512 may be the same or similar to network interface device 112 of FIG. 1 and/or network interface device 212 of FIG. 2.

Power shelf 552 is coupled to DSLAM 510 and splitter 554. Power shelf 552 is operable to provide line power to network interface device 512 over subscriber line 574. For example, power shelf 552 may provide a direct current signal to network interface device 512 over subscriber line 574. In one embodiment, the power supplied by power shelf 552 to network interface device 512 may provide network interface device 512 with enough power to operate service provider interface 250, analog interface 252, data interface 254, and/or processor 256. Power shelf 552 may comprise any hardware, software, firmware, or combination thereof operable to provide power to network interface device 512 over subscriber line 574.

In the illustrated embodiment, power shelf 552 includes ring generator 550. Ring generator 550 is operable to generate ringing power for a telephone 518. For example, when gateway 504 detects an incoming call, gateway 504 may signal ring generator 550, and ring generator 550 may generate a 20 Hz alternating current signal. The signal is communicated to telephone 518 and causes telephone 518 to ring. Ring generator 550 may comprise any hardware, software, firmware, or combination thereof operable to generate ringing power for one or more telephones 518.

Splitter 554 is coupled to power shelf 552, network interface device 512, and switch 556. Splitter 554 is operable to split the ringing power from ring generator 550 and the line power from power shelf 552. For example, splitter 554 may receive both the ringing power from ring generator 550 and the line power from power shelf 552. Splitter 554 may then provide the line power to network interface device 512 along a subscriber line 590 and provide the ringing power to switch 556 over a line 592. In this way, splitter 554 may help to ensure that the line power from power shelf 552 is supplied to network interface device 512, while the ringing power from ring generator 550 is directed to telephone 518 through switch 556. Splitter 554 may comprise any hardware, software, firmware, or combination thereof operable to divide line power and ringing power.

Switch 556 is coupled to network interface device 512, splitter 554, and telephone 518. Switch 556 is operable to alternately connect a telephone line 522 to network interface device 512 and splitter 554. Switch 556 may comprise any hardware, software, firmware, or combination thereof operable to alternately connect telephone line 522 to two or more sources of power.

In one aspect of operation, when an incoming call is directed at telephone 518, ring generator 550 may generate ringing power for telephone 518. Network interface device 512 may receive an indication that an incoming call exists for telephone 518 and instruct switch 556 to connect line 592 and line 522. The ringing power from ring generator 550 travels to splitter 554, which directs the ringing power through line 592 to telephone line 522. The ringing power then causes telephone 518 to ring. If and when a customer answers telephone 518, network interface device 512 may instruct switch 556 to reconnect network interface device 512 to telephone line 522. Network interface device 512 and telephone 518 may then communicate, and the incoming call may be connected to telephone 518. By allowing telephone 518 to receive ringing power from ring generator 550 instead of network interface device 512, network interface device 512 may consume less power because it does not have to generate ring voltages on telephone line 522.

Although FIG. 5 illustrates one example of a system 500 for providing ringing power to a telephone 518, various changes may be made to system 500 without departing from the scope of the present invention. For example, ring generator 550 may comprise a separate element from power shelf 552 and need not reside locally at power shelf 552. Also, network interface device 512 could include splitter 554 and/or switch 556. Other changes may be made to system 500 without departing from the scope of the present invention.

FIG. 6 illustrates an example method 600 for signaling telephone lines according to the teachings of the present invention. While FIG. 6 may be described with respect to network interface device 212 of FIG. 2, method 600 may be used by network interface device 112 of FIG. 1, network interface device 512 of FIG. 5, or any other suitable network interface device.

Network interface device 212 identifies a load placed on each telephone line 222 at step 602. This may include, for example, processor 256 instructing each SLIC 264 to measure the resistance on each telephone line 222. This may also include SLICs 264 generating a voltage on each telephone line 222 and measuring the current on each telephone line 222.

Network interface device 212 receives incoming calls from two or more telephone lines 222 at step 604. This may include, for example, processor 256 receiving ATM cells from service provider 116 through interface 250. This may also include processor 256 identifying the telephone numbers associated with the incoming calls. This may further include processor 256 identifying which telephone line 222 is associated with each of the telephone numbers of the incoming calls, such as using a telephone number-to-telephone line mapping stored in memory 258.

Network interface device 212 determines whether ring voltages can be generated on the identified telephone lines 222 simultaneously at step 606. This may include, for example, processor 256 determining whether the combined load placed on the identified telephone lines 222 exceeds a threshold load. If the combined load on the identified telephone lines 222 does not exceed the threshold load, network interface device 212 may ring the lines 222 simultaneously, and network interface device 212 generates the ring voltages on the telephone lines 222 at step 608. This may include, for example, processor 256 instructing SLICs 264 to generate the ring voltages on the identified lines 222. Network interface device 212 may continue to generate ring voltages on one or more of the telephone lines 222 until each of the incoming calls is answered or the incoming calls are dropped.

In one particular embodiment. if network interface device 212 cannot ring the identified telephone lines 222 simultaneously at step 606, network interface device 212 extracts the caller ID information from the incoming calls at step 610. This may include, for example, processor 256 extracting the caller ID information from the incoming ATM cells received from service provider 116 through interface 250. This may also include processor 256 storing the caller ID information in memory 258.

Whether or not network interface device 212 extracts and stores the caller ID information, network interface device 212 rings the telephone lines 222 in a staggered fashion at step 612. This may include, for example, processor 256 instructing one SLIC 264 to generate a ring voltage on a telephone line 222 for a time period, and then instructing another SLIC 264 to generate a ring voltage on another telephone line 222 during another time period. As each SLIC 264 is generating a ring voltage on a telephone line 222, processor 256 may also communicate the caller ID information stored in memory 258 over that telephone line 222 through analog interface 252. This may allow, for example, the caller ID information to be displayed to customer 114 at the appropriate time during the incoming call.

While FIG. 6 illustrates one example of a method 600 for signaling telephone lines, various changes may be made to method 600 without departing from the scope of the present invention. For example, network interface device 212 may be programmed to stagger the generation of the ring voltages. In this embodiment, network interface device 212 could skip steps 606 and 608. Also, the incoming calls could be received at the same time, or the incoming calls could be received at different, overlapping times. For example, network interface device 212 could receive a first call and begin generating ring voltages on one of the telephone lines 222. Before customer 114 answers the first call, network interface device 212 could receive a second incoming call and begin generating ring voltages on another telephone line 222. In addition, it is not necessary that network interface device 212 extract and store caller ID information in all embodiments.

Figure 7:
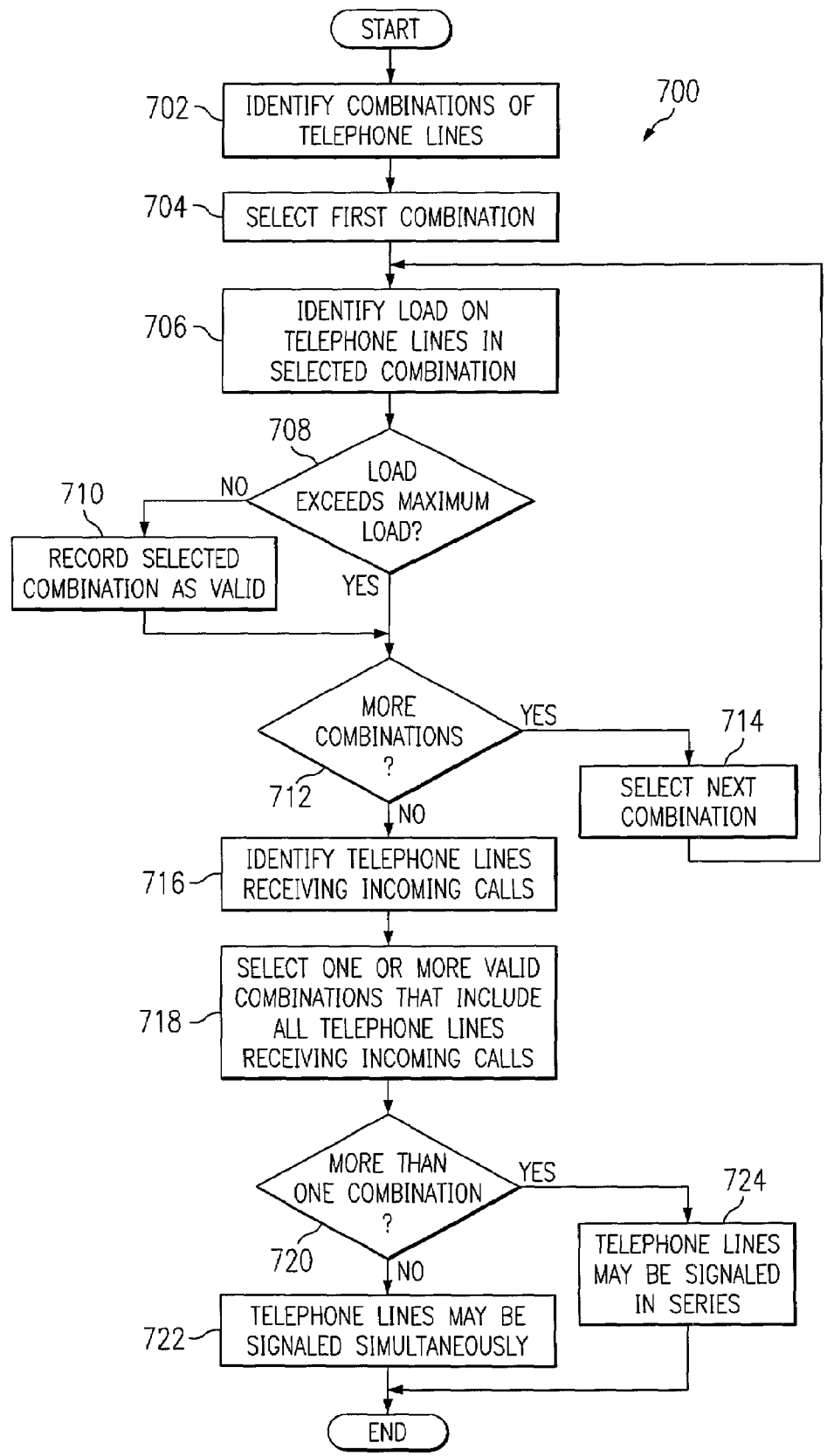
FIG. 7 illustrates an example method for identifying telephone lines to signal according to the teachings of the present invention.

FIG. 7 illustrates an example method 700 for identifying telephone lines 222 to signal according to the teachings of the present invention. Although FIG. 7 may be described with respect to network interface device 212 of FIG. 2, method 700 may also be performed by network interface device of FIG. 1, network interface device 512 of FIG. 5, or any other suitable network interface device.

Network interface device 212 identifies various combinations of telephone lines 222 at step 702. This may include, for example, processor 256 identifying one or more groups of telephone lines 222. As a particular example, network interface device 212 may be coupled to three telephone lines 222. Processor 256 may identify one group of all telephone lines 222, three different groups of two telephone lines 222, and three different groups having one telephone line 222 each.

Network interface device 212 selects the first combination of telephone lines 222 at step 704. This may include, for example, network interface device 212 selecting the combination or group containing all three telephone lines 222. Network interface device 212 identifies the combined load placed on the telephone lines 222 in the selected combination at step 706. This may include, for example, processor 256 instructing SLICs 264 to measure the load placed on each telephone line 222 and receiving the measured loads from SLICs 264. This could also include processor 256 retrieving previously measured loads from memory 258. Network interface device 212 determines whether the total load on the telephone lines 222 in the selected combination exceeds a maximum load at step 708. In one embodiment, this may include processor 256 determining whether the total load exceeds 5 REN, although other loads may be used without departing from the scope of the present invention.

If the total load on the telephone lines 222 in the selected combination does not exceed the maximum load, network interface device 212 records the selected combination of telephone lines 222 as a valid combination at step 710. This may include, for example, processor 256 storing the combination of telephone lines 222 in memory 258. Because the combined load on the telephone lines 222 in the selected combination does not exceed the maximum load, network interface device 212 could generate ring voltages on those telephone lines 222 simultaneously.

Network interface device 212 determines whether additional combinations of telephone lines 222 remain at step 712. If additional combinations remain, network interface device 212 selects the next combination of telephone lines 222 at step 714. Network interface device 212 then returns to step 706 to determine whether the load placed on the new combination of telephone lines 222 exceeds the maximum load.

Once network interface device 212 has examined the identified combinations of telephone lines 222, network interface device 212 may wait to receive incoming calls for customer 114. When network interface device 212 receives multiple incoming calls, network interface device 212 identifies the telephone lines 222 receiving the incoming calls at step 716. This may include, for example, processor 256 analyzing the information received from the service provider 116 over interface 250. As a particular example, network interface device 212 may receive ATM cells from DSLAM 110 identifying the telephone numbers associated with the incoming calls.

Network interface device 212 selects one or more of the valid combinations of telephone lines 222 at step 718. This may include, for example, processor 256 accessing memory 258 and determining whether all of the telephone lines 222 receiving incoming calls may be rung simultaneously. As a particular example, processor 256 may access memory 258 and determine whether any valid combination of telephone lines 222 includes all of the telephone lines 222 currently receiving the incoming calls. If so, processor 256 may select that combination of telephone lines 222. Otherwise, processor 256 may select more than one combination of telephone lines 222. For example, processor 256 may determine whether any valid combination of telephone lines 222 includes all but one of the telephone lines 222 receiving the incoming calls. If so, processor 256 may select two combinations, one combination including all but one of the telephone lines 222 and another containing the remaining telephone line 222.

Network interface device 212 determines whether more than one combination of telephone lines 222 was selected at step 720. If only one combination of telephone lines 222 was selected, network interface device 212 determines that the telephone lines 222 may be signaled simultaneously at step 722. This may include, for example, processor 256 determining that ring voltages can be simultaneously generated on all of the telephone lines 222 receiving the incoming calls. Otherwise, network interface device 212 determines that the telephone lines 222 receiving the incoming calls may be signaled in series or in a staggered fashion at step 724. This may include, for example, processor 256 determining that ring voltages can be generated on one combination of telephone lines 222 for one time period, and then ring voltages may be generated on another combination of telephone lines 222 during another time period.

Although FIG. 7 illustrates one example embodiment of a method 700 for identifying telephone lines 222 to signal, various changes may be made to method 700 without departing from the scope of the present invention. For example, network interface device 212 may use method 700 to determine whether two or more telephone lines 222 can be signaled simultaneously. In another embodiment, network interface device 212 always staggers the generation of ring voltages on telephone lines 222. In this embodiment, network interface device 212 need not perform method 700. Also, rather than measuring the load placed on each telephone line 222 before receiving the incoming calls, network interface device 212 could measure the load placed on a telephone line 222 after receiving an incoming call for that telephone line 222.

Figure 8:
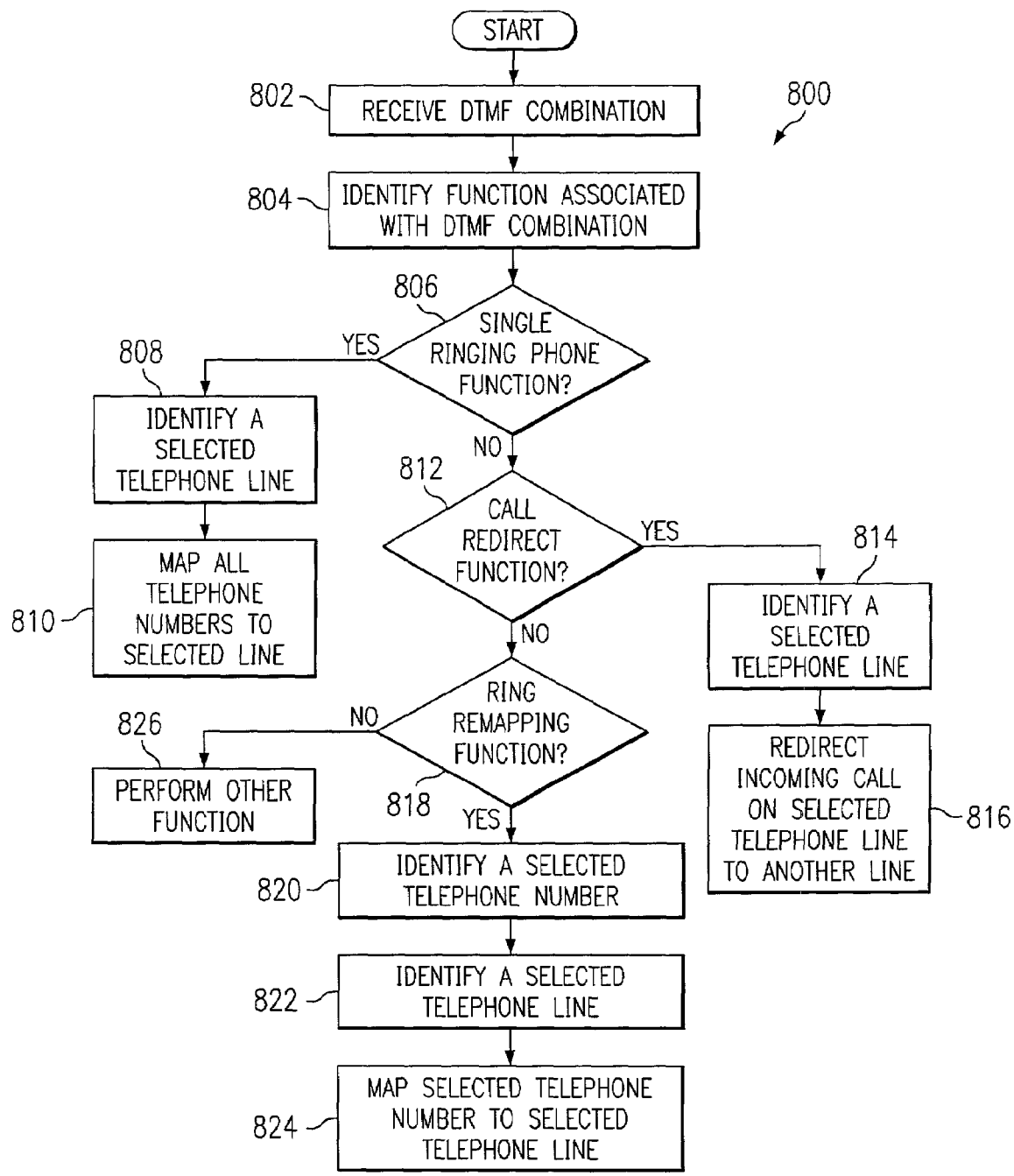
FIG. 8 illustrates an example method for channel routing according to the teachings of the present invention.

FIG. 8 illustrates an example method 800 for channel routing according to the teachings of the present invention. Although method 800 may be described with respect to network interface device 212 of FIG. 2, method 800 may be performed by network interface 112 of FIG. 1, network interface device 512 of FIG. 5, or any other suitable network interface device.

Network interface device 212 receives a DTMF combination at step 802. This may include, for example, a customer 114 pressing a combination of buttons on the keypad of a telephone coupled to a telephone line 222. This may also include codec 266 receiving the resulting DTMF tones and identifying the specific buttons pressed by customer 114. Codec 266 may further communicate the identified buttons to processor 256. Network interface device 212 identifies the function associated with the DTMF combination at step 804. This may include, for example, processor 256 receiving the identification of the buttons pressed by customer 114 from codec 266 and determining which function is associated with the button combination.

Network interface device 212 determines whether the requested function is a single ringing telephone function at step 806. The single ringing telephone function may, for example, cause network interface device 212 to route all incoming calls to a single telephone line 222. If the identified function is the single ringing telephone function, network interface device 212 identifies a selected telephone line 222 at step 808. This may include, for example, processor 256 identifying one of the telephone lines 222 based on the buttons pressed by customer 114 and decoded by codec 266. In a particular embodiment, customer 114 may identify a selected telephone line 222 by the telephone number associated with that telephone line 222, a number or code associated with that telephone line 222, or in any other suitable manner. Network interface device 212 maps all telephone numbers to the selected telephone line 222 at step 808. This may include, for example, processor 256 updating a telephone number-to-telephone line mapping in memory 258. In particular, processor 256 may update the mapping to show that all telephone numbers are mapped to the identified telephone line 222.

If customer 114 did not request the single ringing telephone function at step 806, network interface device 212 determines whether the customer 114 requested the call redirect function at step 812. The call redirect function may, for example, allow network interface device 212 to redirect an incoming call from one telephone line 222 to another telephone line 222. If customer 114 requested the call redirect function, network interface device 212 identifies a selected telephone line 222 at step 814. The selected telephone line 222 may be provided by customer 114, determined by processor 256 based on the telephone line 222 currently receiving an incoming call, and/or in any other suitable manner. Network interface device 212 redirects an incoming call from the selected telephone line 222 to another telephone line 222 at step 816. This may include, for example, processor 256 instructing DSP 268 and/or codec 266 to redirect the incoming call to a different telephone line 222. The telephone line 222 to which the call is redirected may be identified in any suitable manner. For example, network interface device 212 may redirect the call to the telephone line 222 over which the DTMF combination was received at step 802.

If customer 114 did not request the call redirect function at step 812, network interface device 212 determines whether the customer 114 requested the ring remapping function at step 818. The ring remapping function may, for example, allow a customer 114 to reassign telephone numbers to different telephone lines 222. If customer 114 requested the ring remapping function, network interface device 212 identifies a selected telephone number at step 820. This may include, for example, processor 256 identifying the selected telephone number based on the received DTMF combination. As particular examples, customer 114 may identify a telephone number by entering the telephone number on the keypad of a telephone coupled to telephone line 222, by entering a number or code associated with the telephone number, or in any other suitable manner. Network interface device 212 identifies a selected telephone line 222 at step 822. This may include, for example, processor 256 identifying the selected telephone line 222 based on the received DTMF combination. Network interface device 212 maps the selected telephone number to the selected telephone line 222 at step 824. This may include, for example, processor 256 updating the telephone number-to-telephone line mapping in memory 258.

If customer 114 did not request the ring remapping function at step 818, network interface device 212 may perform other functions at step 826. Network interface devices 212 may support any additional functions for customer 114. For example, network interface device 212 could allow a customer 114 to identify different distinctive rings to be generated on each telephone line 222. Any other and/or additional functions may be performed by network interface device 212 without departing form the scope of the present invention.

Although FIG. 8 illustrates one example embodiment of a method 800 for channel routing, various changes may be made to method 800 without departing from the scope of the present invention. For example, FIG. 8 illustrates one example series of steps 806, 812, and 818 in which network interface device 212 identifies the requested function entered by customer 114. Network interface device 212 may not need to perform steps 806, 812, and 818 in the illustrated order. Also, network interface device 212 could perform the specific function requested by customer 114 after that function is identified at step 804, without going through the series of steps 806, 812, 818.

FIG. 9 illustrates an example method 900 for providing service during a power loss according to the teachings of the present invention. Although method 900 may be described with respect to network interface device 212 of FIG. 2, method 900 could be performed by network interface device 112 of FIG. 1, network interface device 512 of FIG. 5, or any other suitable network interface device.

Network interface device 212 provides service to customer 114 using local power at step 902. This could include, for example, network interface device 212 communicating and/or receiving voice, facsimile, and/or data traffic. The local power used by network interface device 212 could come from a battery 278 and/or an external power supply 280. Network interface device 212 detects a local power failure at step 904. This may include, for example, processor 256 determining that power is no longer being supplied by external power supply 280 and battery 278. The local power failure may be the result of a wide variety of factors, such as a loss of power at customer 114 and/or the draining of battery 278.

Network interface device 212 stops supplying power to data interface 254 at step 906. This may include, for example, processor 256 removing power from one or more components of data interface 254. Network interface device 212 drops any data virtual circuits at step 908. In one embodiment, network interface device 212 communicates and receives ATM cells in system 100 using data virtual circuits. Dropping the data virtual circuits may reduce the number of ATM cells communicated and/or received by network interface device 212, which reduces the use of processor 256 and memory 258 and helps to reduce the amount of power consumed by network interface device 212. Network interface device 212 also stops supplying power to some telephone interfaces at step 910. This may include, for example, processor 256 removing power from one or more SLICs 264 in analog interface 252. This also reduces the amount of power consumed by network interface device 212 during operation.

Network interface device 212 operates at least one telephone interface at step 912. This may include, for example, processor 256 allowing one or more SLICs 264 to continue receiving power and provide service to at least one telephone line 222 of customer 114. The one or more SLICs 264 that continue to operate may be powered by line power received by network interface device 212 over subscriber line 274. This allows network interface device 212 to ensure that at least one telephone line 222 is available to customer 114 during a power outage. This may be referred to as providing a "lifeline" to customer 114.

Although FIG. 9 illustrates one example embodiment of a method 900 for providing service during a power loss, various changes may be made to method 900 without departing from the scope of the present invention. For example, FIG. 9 illustrates network interface device 212 stopping the supply of power to at least one SLIC 264 at step 910. In another embodiment, network interface device 212 could continue to supply power to all SLICs 264 coupled to telephone lines 222.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

The invention claimed is:

1. A network interface device, comprising:
   a first interface operable to receive at least two incoming calls over a subscriber line;
   a second interface operable to facilitate communication between the first interface and a first telephone line and between the first interface and a second telephone line, the second interface also operable to generate one or more first ring voltages on the first telephone line and one or more second ring voltages on the second telephone line; and
   a processor coupled to the first interface and the second interface, the processor operable to instruct the second interface to generate the first and second ring voltages in response to receiving the incoming calls, the processor also operable to:
      measure a total instantaneous load placed on the second interface;
      compare the total instantaneous load to a determined threshold level; and
      if the total instantaneous load exceeds the threshold level, maintain the total instantaneous load below the determined threshold level by shifting in time the respective peak voltages of the first and second ring voltages.

2. The network interface device of claim 1, wherein the processor is operable to allocate the first and second ring voltages by staggering the first and second ring voltages such that the one or more first ring voltages on the first telephone line are generated at different times than the one or more second ring voltages on the second telephone line.

3. The network interface device of claim 2, wherein the processor staggers the first and second ring voltages after determining that the total instantaneous load placed on the first and second telephone lines exceeds the determined threshold level.

4. The network interface device of claim 1, wherein the processor is operable to allocate the first and second ring voltages by instructing the second interface to generate the first and second ring voltages simultaneously.

5. The network interface device of claim 4, wherein the processor instructs the second interface to generate the first and second ring voltages simultaneously after determining that the total instantaneous load placed on the first and second telephone lines does not exceed the determined threshold load.

6. The network interface device of claim 1, wherein the second interface is further operable to measure a load placed on each of the telephone lines.

7. The network interface device of claim 1, wherein the processor is further operable to:
   extract class of service information from the incoming calls; and
   communicate the class of service information for each incoming call to the telephone line associated with the incoming call during the generation of the ring voltage on the telephone line associated with the incoming call.

8. The network interface device of claim 1, wherein:
   the second interface is further operable to decode dual-tone multi-frequency touch tones received over one of the telephone lines and to communicate the decoded tones to the processor; and
   the processor is further operable to:
      map all telephone numbers associated with the telephone lines to a selected telephone line in response to a first function identified by the decoded tones;
      map a selected telephone number to a selected telephone line in response to a second function identified by the decoded tones; and
      redirect an incoming call from one of the telephone lines to another of the telephone lines in response to a third function identified by the decoded tones.

9. The network interface device of claim 1, further comprising a local power supply operable to supply at least some power to at least one of the processor, the first interface, and the second interface;
   wherein the network interface device draws power from the subscriber line after the local power supply fails; and
   wherein the second interface remains operable to communicate over at least one of the telephone lines after the local power supply fails.

10. The network interface device of claim 1, wherein the processor is further operable to instruct a switch to alternately couple one of the telephone lines to either the second interface or a splitter, the splitter operable to receive ringing power for the telephone line and line power for the network interface device, the splitter operable to communicate the line power to the network interface device and the ringing power to the telephone line.

11. The network interface device of claim 1, further comprising a third interface coupled to the processor and operable to communicate with at least one digital device.

12. The network interface device of claim 11, wherein:
   the first interface comprises at least one of a Digital Subscriber Line (DSL) interface, a cable interface, and a wireless interface;
   the second interface comprises:
      at least one subscriber line interface circuit coupled to at least one of the telephone lines and operable to generate the ring voltage on the at least one telephone line;
      at least one codec coupled to at least one subscriber line interface circuit and operable to convert analog information into digital information and to convert digital information into analog information; and
      a digital signal processor coupled to the at least one codec and to the processor, the digital signal processor operable to sample digital information from the at least one codec and to communicate the samples to the processor, the digital signal processor also operable to receive digital information from the processor and communicate the digital information to the at least one codec; and
   the third interface comprises at least one of a Home Phoneline Network Alliance interface, an Ethernet interface, a local area network interface, an optical interface, and a wireless interface.

13. The network interface device of claim 1, wherein each of the one or more first ring voltages have a duration of two seconds followed by a four second pause.

14. A method for providing service to a subscriber, comprising:
   receiving at least two incoming calls over a subscriber line;
   identifying a first telephone line and a second telephone line associated with the incoming calls;

measuring a total instantaneous load placed on a network interface device coupled to the first and the second telephone lines;
comparing the total instantaneous load to a determined threshold level; and
if the total instantaneous load exceeds the threshold level, maintaining the total instantaneous load below the determined threshold level by shifting in time the respective peak voltages of one or more first ring voltages and one or more second ring voltages.

15. The method of claim 14, wherein allocating the first and second ring voltages comprises staggering the first and second ring voltages such that the one or more first ring voltages on the first telephone line are generated at different times than the one or more second ring voltages on the second telephone line.

16. The method of claim 15, wherein staggering the first and second ring voltages comprises staggering the first and second ring voltages after determining that the total instantaneous load placed on the first and second telephone lines exceeds the determined threshold level.

17. The method of claim 14, wherein allocating the first and second ring voltages comprises initiating simultaneous generation of the first and second ring voltages.

18. The method of claim 17, wherein initiating simultaneous generation of the first and second ring voltages comprises initiating simultaneous generation of the first and second ring voltages after determining that the total instantaneous load placed on the first and second telephone lines does not exceed the determined threshold load.

19. The method of claim 14, further comprising measuring a load placed on each of the telephone lines.

20. The method of claim 14, further comprising:
extracting class of service information from the incoming calls; and
communicating the class of service information for each incoming call to the telephone line associated with the incoming call during the generation of the ring voltage on the telephone line associated with the incoming call.

21. The method of claim 14, further comprising:
decoding dual-tone multi-frequency touch tones received over one of the telephone lines;
mapping all telephone numbers associated with the telephone lines to a selected telephone line in response to a first function identified by the decoded tones;
mapping a selected telephone number to a selected telephone line in response to a second function identified by the decoded tones; and
redirecting an incoming call from one of the telephone lines to another of the telephone lines in response to a third function identified by the decoded tones.

22. The method of claim 14, further comprising:
drawing at least some power for the network interface device from a local power supply;
drawing power from the subscriber line after the local power supply fails; and
allowing communication over at least one of the telephone lines after the local power supply fails.

23. The method of claim 14, further comprising instructing a switch to alternately couple one of the telephone lines to either the network interface device or a splitter, the splitter operable to receive ringing power for the telephone line and line power for the network interface device, the splitter operable to communicate the line power to the network interface device and the ringing power to the telephone line.

24. The method of claim 14, further comprising communicating with at least one digital device.

25. The method of claim 14, wherein each of the one or more first ring voltages have a duration of two seconds followed by a four second pause.

26. Software for providing service to a subscriber, the software embodied in at least one computer-readable medium and when executed by one or more processors operable to:
receive at least two incoming calls over a subscriber line;
identify a first telephone line and a second telephone line associated with the incoming calls;
measure a total instantaneous load placed on the interface to the first and the second telephone lines;
compare the total instantaneous load to a determined threshold level; and
if the total instantaneous load exceeds the threshold level, instruct the interface to generate one or more first ring voltages on the first telephone line and one or more second ring voltages on the second telephone line, the respective peak voltages of the first and second ring voltages shifted in time so that the total instantaneous load does not exceed the determined threshold level.

27. A network interface device, comprising:
means for receiving at least two incoming calls over a subscriber line;
means for generating one or more first ring voltages on a first telephone line and one or more second ring voltages on a second telephone line;
means for measuring a total instantaneous load placed on a network interface device coupled to the first and the second telephone lines;
means for comparing the total instantaneous load to a determined threshold level; and
means for maintaining the total instantaneous load below the determined threshold level by shifting in time the respective peak voltages of one or more first ring voltages and one or more second ring voltages if the total instantaneous load exceeds the threshold level.

28. A network interface device comprising;
a first interface operable to receive at least two incoming calls over a subscriber line;
a second interface operable to facilitate communication between the first interface and a first telephone line and between the first interface and a second telephone line, the second interface also operable to generate one or more first ring voltages on the first telephone line and one or more second ring voltages on the second telephone line; and
a processor coupled to the first interface and the second interface, the processor operable to:
measure a total instantaneous load placed on the second interface;
compare the total instantaneous load to a determined threshold level; and
if the total instantaneous load exceeds the threshold level, instruct the second interface to generate the first and second ring voltages in response to receiving the incoming calls, the generation of the ring voltages staggered such that the one or more first peak ring voltages on the first telephone line are shifted in time at different times than the one or more second peak ring voltages on the second telephone line.

29. A network interface device comprising;
a first interface operable to receive at least two incoming calls over a subscriber line;
a second interface operable to facilitate communication between the first interface and a first telephone line and between the first interface and a second telephone line, the second interface also operable to generate one or more first ring voltages on the first telephone line and one or more second ring voltages on the second telephone line; and a processor coupled to the first interface and the second interface, the processor operable to:

determine whether a total load placed on the first and second telephone lines exceeds a threshold load;

transmit a first instruction instructing the second interface to allow a simultaneous generation of the first and second ring voltages on the telephone when the total load placed on the telephone lines does not exceed the threshold load;

transmit a second instruction instructing the second interface to shift in time the respective peak voltages created by the generation of the first and second ring voltages when the total load placed on the telephone lines exceeds the threshold level; and switch between the transmissions of the first and second instructions based on the dtermination.

* * * * *